United States Patent

Itoigawa

[11] Patent Number: 5,659,403
[45] Date of Patent: *Aug. 19, 1997

[54] DOCUMENT FEEDER WITH STAMP IN DOCUMENT SCANNING APPARATUS

[75] Inventor: Minoru Itoigawa, Nakatugawa, Japan

[73] Assignee: Ricoh Company, Ltd., Tokyo, Japan

[*] Notice: The term of this patent shall not extend beyond the expiration date of Pat. No. 5,497,250.

[21] Appl. No.: 575,102

[22] Filed: Dec. 19, 1995

Related U.S. Application Data

[63] Continuation of Ser. No. 289,491, Aug. 12, 1994, Pat. No. 5,535,022.

[30] Foreign Application Priority Data

Sep. 16, 1993 [JP] Japan ................................ 5-230090

[51] Int. Cl.⁶ .............................. H04N 1/00; H04N 1/04
[52] U.S. Cl. ........................ 358/474; 358/400; 358/405; 358/496
[58] Field of Search ................................ 358/400, 401, 358/402, 405, 434, 474, 440, 496, 296; 346/78, 94; 101/103, 327, 368; 400/82, 149; H04N 1/00, 1/04

[56] References Cited

U.S. PATENT DOCUMENTS

| | | | |
|---|---|---|---|
| 2,746,380 | 5/1956 | Gottscho | 101/35 |
| 4,901,158 | 2/1990 | Sato et al. | 358/296 |
| 4,908,714 | 3/1990 | Iriyama et al. | 358/405 |
| 5,497,250 | 3/1996 | Kawashima | 358/498 |
| 5,535,022 | 7/1996 | Itoigawa | 358/496 |

Primary Examiner—Edward L. Coles, Sr.
Assistant Examiner—Kimberly A. Williams
Attorney, Agent, or Firm—Oblon, Spivak, McClelland, Maier & Neustadt, P.C.

[57] ABSTRACT

A document scanning apparatus which includes a automatic document feeder and a stamp holder, with a stamping face marking on documents and a stamping solenoid moving the stamping face. The stamp holder is located on the outside of the automatic document feeder cover, and the stamp holder is operatable to open and close. The stamping face faces in the direction of an exit roller of the automatic document feeder. Further, the stamping face is angled so that it can return to a retracted position by its own weight.

22 Claims, 2 Drawing Sheets

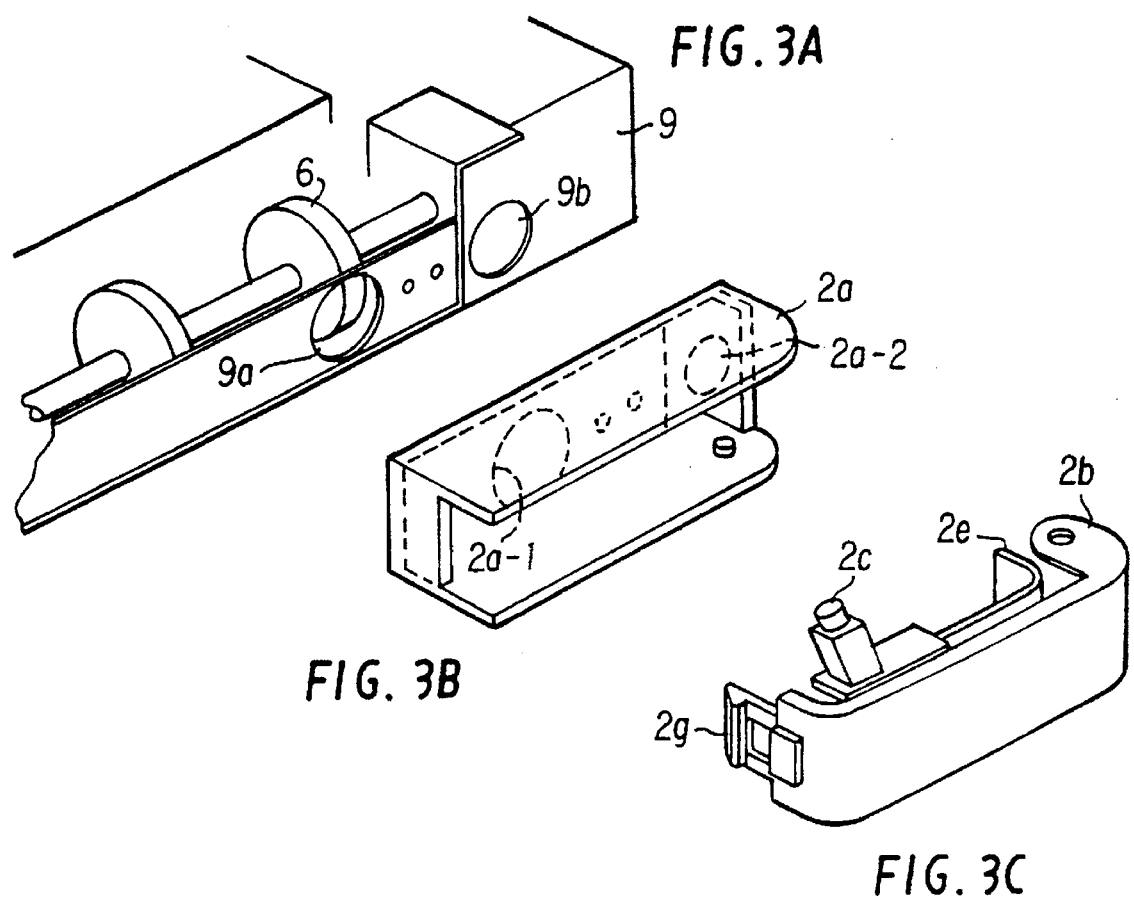
FIG. 3A
FIG. 3B
FIG. 3C
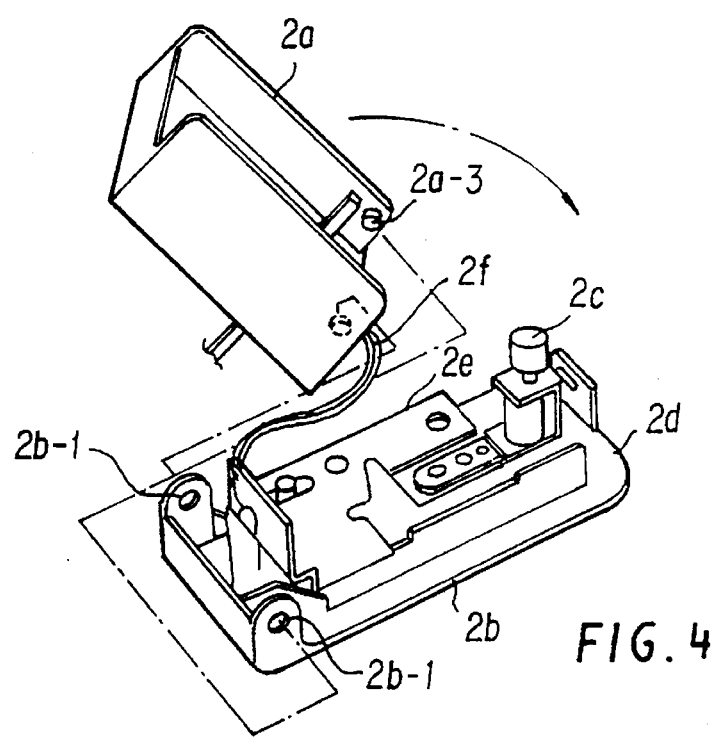
FIG. 4

DOCUMENT FEEDER WITH STAMP IN DOCUMENT SCANNING APPARATUS

This is a Continuation of application Ser. No. 08/289,491 filed on Aug. 12, 1994, now U.S. Pat. No. 5,535,022.

BACKGROUND OF THE INVENTION

1. Field of The Invention

This invention relates to an automatic document feeder in a document scanning apparatus capable of performing stamping on documents after scanning data of the documents.

2. Description of the Related Art

Some scanning apparatuses having automatic document feeders, for example in a facsimile machine, have a stamp. If the page was transmitted without error or stored successfully, the stamp marks the page for informing the operator.

Generally, stamps are positioned on the inside of the scanning apparatus. This is shown in Japanese Laid-Open Utility Model Publication No. 36256/1990; Japanese Laid-Open Utility Model Publication No. 68556/1990; Japanese Laid-Open Utility Model Publication No. 116667/1989; Japanese Laid-Open Utility Model Publication No. 6364/1991; and Japanese Laid-Open Patent Publication No. 17557/1989.

However, in such a document scanning apparatus with a stamp, in the case of exchanging the stamp or supplying ink to the stamp, the operator needs to open the whole document scanning apparatus or a complex mechanism is needed for the document scanning apparatus and/or the stamping means to hold the stamp or supply ink thereto.

SUMMARY OF THE INVENTION

It is therefore an object of the present invention to provide a document scanning apparatus capable of permitting easy exchanging of stamps or supplying ink to the stamps.

According to a feature of the invention, an automatic document feeder in a document scanning apparatus includes a stamp holder located on the outside of the automatic document feeder, a stamping face for marking on documents, and a stamping solenoid for moving the stamping face.

According to another feature of the invention, the stamp holder is operatable to open and close.

According to yet another feature of the invention, the automatic document feeder has at least one exit roller, and the stamping face is positioned in the stamp holder so as to face one of the exit rollers.

According to a further feature of the invention, the stamping face is angled so as to return to a retracted position by its own weight.

According to yet a further feature of the invention, the scanning apparatus is a facsimile.

According to still a further feature of the invention, the scanning apparatus is a copier.

According to still a further feature of the invention, the scanning apparatus is a digital copier.

According to still a further feature of the invention, the scanning apparatus is an electrical filing system.

According to still a further feature of the invention, the scanning apparatus is an optical filing system.

According to still a further feature of the invention, the automatic document feeder has at least one exit roller, a stamping face for marking on documents and facing one of the exit rollers, and a stamping solenoid operating for moving the stamping face.

According to still a further feature of the invention, the stamping face is angled so as to return to a retracted position by its own weight.

According to still a further feature of the invention, the scanning apparatus is a facsimile.

According to still a further feature of the invention, the scanning apparatus is a copier.

According to still a further feature of the invention, the scanning apparatus is a digital copier.

According to still a further feature of the invention, the scanning apparatus is an electrical filing system.

According to still a further feature of the invention, the automatic document feeder has a stamping face for marking on documents and is angled so as to return to a retracted position by its own weight, and a stamping solenoid operates for moving the stamping face.

According to still a further feature of the invention, the scanning apparatus is a facsimile.

According to still a further feature of the invention, the scanning apparatus is a copier.

According to still a further feature of the invention, the scanning apparatus is a digital copier.

According to still a further feature of the invention, the scanning apparatus is an electrical filing system.

BRIEF DESCRIPTION OF THE DRAWINGS

Other objects and features of this invention will become understood from the following description with reference to the accompanying drawings in which:

FIG. 3 is an exploded view in perspective of the stamping mechanism according to the embodiment of FIGS. 1 and 2; and FIG. 4 is an exploded view in perspective of a stamp holder according to the embodiment of FIGS. 1 and 2.

DETAILED DESCRIPTION OF THE PREFERRED EMBODIMENT

Now, an embodiment of the invention will be described in detail with reference to the drawings.

Figure 1:
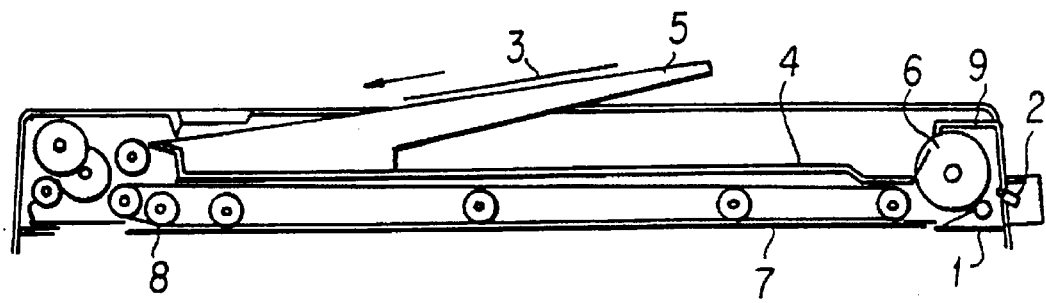
FIG. 1 is a sectional view showing an auto document feeder according to an embodiment of the present invention.
Figure 2:
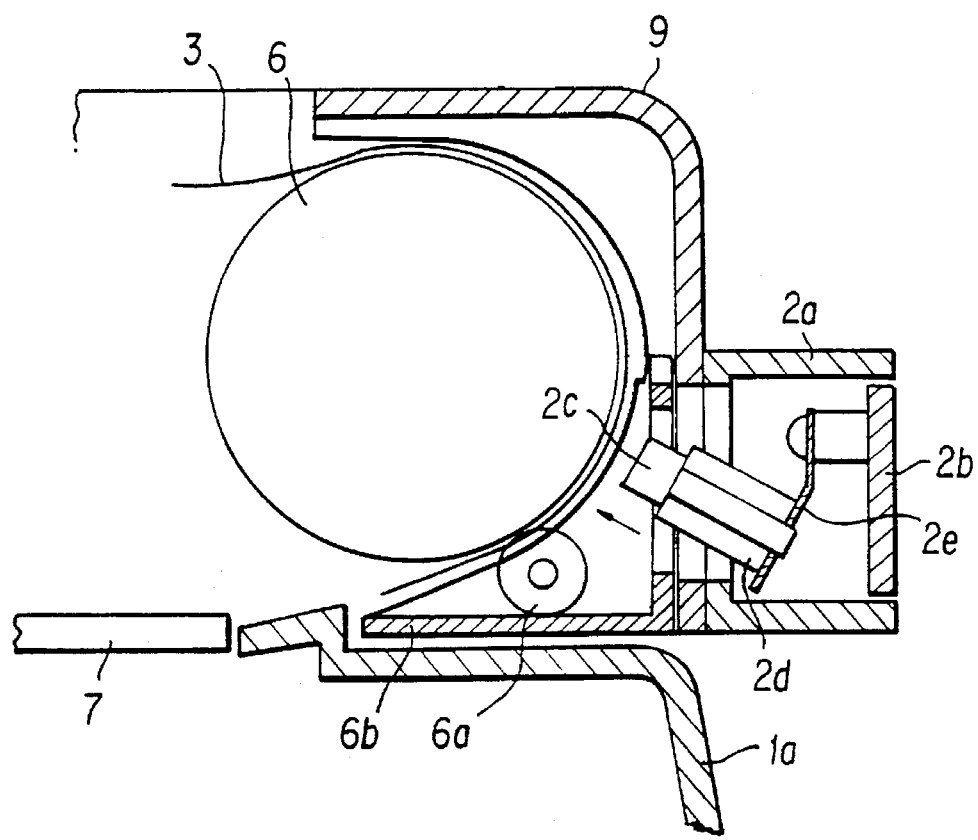
FIG. 2 is an enlarged sectional view showing a feed-out section of the auto document feeder of FIG. 1 and a stamping mechanism thereon.

In FIGS. 1 and 2, a main apparatus 1, for example a facsimile, a copier, a digital copier, an electrical filing apparatus, an optical filing apparatus, or another apparatus or system including a scanner, has an automatic document feeder according to an embodiment of the present invention mounted thereon. The main apparatus can be, for example, the image forming apparatus disclosed in U.S. Pat. No. 5,278,622; the image reader disclosed in U.S. Pat. No. 5,143,363 or the electronic filing system disclosed in U.S. Pat. No. 5,296,966, all of which are hereby incorporated herein by reference. Each of these main apparatuses includes a document scanning apparatus which will not here be described in detail.

The automatic document feeder includes a stamp 2 for stamping a mark on documents, a document receiving tray 4 for receiving discharged documents, a document table 5 for setting documents thereon, one or more exit rollers 6 in a document feed-out section and for discharging documents after scanning data of the documents, an exposure glass 7 mounted on the main apparatus 1 so that data of documents thereon may be scanned, and a transport belt 8 for conveying documents from a pick-up section to a scanning position on the exposure glass 7 and from the scanning position to the feed-out section.

Document sheets 3 to be scanned are set on the document table 5 with the data side down. The bottom document sheet 3 is separated from the rest. The transport belt 8 drives the separated document sheet 3 to a pre-decided position (this position is decided based on the size of the documents and the orientation of the documents) on the exposure glass 7. After scanning the data on the document sheet 3, the transport belt 8 drives the document sheet 3 to the document feed-out section including the exit rollers 6.

As seen in FIG. 2, the document sheet 3 is sent to a position between the exit rollers 6 and assist rollers 6a by a feed guide plate 6b.

The exit rollers 6 are driven by a document feed (DF) motor (not shown) having a CPU. When the CPU of the DF receives the feed next page signal from the CPU of the scanner and plotter control unit, the DF motor starts turning. Simultaneously, the transport belt 8 carries the document sheet 3 to the exit rollers 6, and the exit rollers 6 feed out the document sheet 3.

The stamp 2 is also controlled by the CPU of the DF. As seen in FIG. 2, a stamp cover 2a and a stamp holder 2b enclose the stamping mechanism which is mounted to the exterior of the cover 9 of the automatic document feeder. The stamp includes a stamp face 2c for marking on the documents, a stamp solenoid 2d for controlling the movement of the stamp face 2c and a supporting plate 2e on which the stamp solenoid 2d is supported. The stamp face 2c has an elastic, ink bearing stamping part and a piston-like metal armature which fits into the solenoid 2d so that the stamp face 2c is advanced out of the solenoid 2d when the solenoid is energized.

When the CPU of the DF receives a stamp start signal, the DF motor starts rotating to carry the document sheet 3 to the stamp position. When the document sheet 3 reaches the stamp position detected by an unillustrated sensor (this timing depends on the length of the document and the stamp position on the document), the DF motor stops. After this, the DF CPU energizes the stamp solenoid 2d if the page of the document sheet 3 was scanned successfully, for example if, in a facsimile, the page was sent (immediate transmission) or stored successfully (memory transmission). When the stamp solenoid 2d is energized, the stamp face 2c is extended out of the stamp solenoid from a retracted position and toward one of the exit rollers 6. The document sheet 3 is then positioned between the stamp face 2c and the one of the exit rollers 6, and so the stamp face 2c reaches a stamping position where it contacts the document sheet 3 to press the document sheet against the exit roller 6 and place a mark thereon.

After stamping on the document sheet 3, the stamp solenoid 2d is deenergized. Due to the angle of the stamp face 2c, it rises as it advances out of the stamp solenoid and returns to the retracted position due to its own weight. The DF motor then starts again for feeding out the document sheet 3.

The stamping position on the document can be changed from the trailing edge area of the sheet to the leading edge area by adjusting the RAM in the scanner CPU.

FIG. 3 illustrates the main part of the automatic document feeder 1 to which the stamping mechanism is mounted, a stamp cover 2a of the stamping mechanism, and a stamp holder 2b of the stamping mechanism.

As seen in FIG. 3, a stamp face hole 9a in the automatic document feeder cover 9 is for the stamp face 2c to extend therethrough. A lead wire hole 9b in the automatic document feeder cover 9 is for passage of a lead wire 2f controlling the stamp solenoid 2d. The lead wire 2f connects to a control panel for the automatic document feeder. A hole 2a-1 in stamp cover 2a is aligned with the stamp face hole 9a, and the stamp face 2c can extend therethrough. A hole 2a-2 in stamp holder 2b is in alignment with the lead wire hole 9b. An attaching device, for example a clasp 2g, is for attaching the stamp holder 2b to the stamping cover 2a.

As seen in FIG. 4, a convexity 2a-3 is located on the stamp cover 2a and a hole 2b-1 is located on the stamp holder 2b for engaging the convexity 2a-3. The stamp holder 2b pivots on the stamp cover 2a with the hole 2b-1 cooperating with the convexity 2a-3, and the stamp holder clasp 2g secures to the stamp cover 2a. The stamp cover 2a mounts on the frame of the automatic document feeder 9 via a screw.

Thus, the stamp cover 2a and stamp holder 2b mount on the outside of the automatic document feeder, and the stamp holder 2b is pivotable to open and close, so it is easy for operators to exchange or fix the stamping units.

As seen in FIGS. 2 and 3, the exit rollers are cylindrically shaped, and the stamp face 2c is positionable against the face of one of the exit rollers through the hole 2a-1 and the hole 9a to stamp a document sheet 3 therebetween. Thus the stamping mechanism according to an embodiment of the present invention needs no separate backing member for the stamp because the one of the exit rollers 6 acts as a backing member.

And as seen in FIGS. 2, 3, and 4, the stamp solenoid 2d is fixed on the supporting plate 2e by a screw and the supporting plate 2e is fixed on the stamp holder 2b by a screw. Since the stamp solenoid 2d is fixed on the plate 2e at such an angle with respect to the horizontal that the stamp face rises as it extends out of the stamp solenoid, the stamping face 2c returns to a retracted position by its own weight after marking on the document and the solenoid 2d is de-energized. The optimum angle is between 22° and 26°. Thus, the stamping face 2c returns to the retracted position automatically and without a return force from the stamp solenoid 2d, and so only a simple mechanism is needed.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An automatic document feeder in a document scanning apparatus, comprising:

an automatic document feeder cover enclosing means for feeding documents for the document scanning apparatus, said feeding means including at least one exit roller;

a stamping face for marking on documents and facing one of said exit rollers; and a stamping solenoid for moving said stamping face from a retracted position to a stamping position to mark documents, wherein the documents being marked are pressed between said stamp face and said one of said exit rollers as a backing member.

2. The document feeder as claimed in claim 1, wherein a direction of movement of said stamping face from said retracted position to said stamping position is angled such that said stamping face rises when moving from said retracted position to said stamping position, and such that said stamping face returns from said stamping position to said retracted position due to its own weight.

3. The document feeder as claimed in claim 1, wherein said scanning apparatus is in a facsimile.

4. The document feeder as claimed in claim 1, wherein said scanning apparatus is in a copier.

5. The document feeder as claimed in claim 1, wherein said scanning apparatus is in a digital copier.

6. The document feeder as claimed in claim 1, wherein said scanning apparatus is in an electrical filing system.

7. A document scanning apparatus having an automatic document feeder, comprising:

an automatic document feeder cover enclosing means for feeding documents for the document scanning apparatus, said feeding means including at least one exit roller;

a stamping face for marking on documents and facing one of said exit rollers; and a stamping solenoid for moving said stamping face from a retracted position to a stamping position to mark documents, wherein the documents being marked are pressed between said stamp face and said one of said exit rollers as a backing.

8. The document scanning apparatus as claimed in claim 7, wherein a direction of movement of said stamping face from said retracted position to said stamping position is angled such that said stamping face rises when moving from said retracted position to said stamping position, and such that said stamping face returns from said stamping position to said retracted position due to its own weight.

9. The document scanning apparatus as claimed in claim 7, wherein said scanning apparatus is in a facsimile.

10. The document scanning apparatus as claimed in claim 7, wherein said scanning apparatus is in a copier.

11. The document scanning apparatus as claimed in claim 7, wherein said scanning apparatus is in a digital copier.

12. The document scanning apparatus as claimed in claim 7, wherein said scanning apparatus is in an electrical filing system.

13. An automatic document feeder in a document scanning apparatus and comprising:

a automatic document feeding means;

a stamping face positioned for marking on documents being fed by said feeding means; and a stamping solenoid for moving said stamping face from a retracted position to a stamping position to mark documents, wherein a direction of movement of said stamping face from said retracted position to said stamping position is angled such that said stamping face rises when moving from said retracted position to said stamping position, and such that said stamping face returns from said stamping position to said retracted position due to its own weight.

14. The document feeder as claimed in claim 13, wherein said scanning apparatus is in a facsimile.

15. The document feeder as claimed in claim 13, wherein said scanning apparatus is in a copier.

16. The document feeder as claimed in claim 13, wherein said scanning apparatus is in a digital copier.

17. The document feeder as claimed in claim 13, wherein said scanning apparatus is in an electrical filing system.

18. A document scanning apparatus, comprising:

a automatic document feeder;

a stamping face positioned for marking on documents being fed by said automatic document feeder; and a stamping solenoid for moving said stamping face from a retracted position to a stamping position to mark documents, wherein a direction of movement of said stamping face from said retracted position to said stamping position is angled such that said stamping face rises when moving from said retracted position to said stamping position, and such that said stamping face returns from said stamping position to said retracted position due to its own weight.

19. The document scanning apparatus as claimed in claim 18, wherein said scanning apparatus is in a facsimile.

20. The document scanning apparatus as claimed in claim 18, wherein said scanning apparatus is in a copier.

21. The document scanning apparatus as claimed in claim 18, wherein said scanning apparatus is in a digital copier.

22. The document scanning apparatus as claimed in claim 18, wherein said scanning apparatus is in an electrical filing system.

* * * * *